F. HUFF.
SICKLE BAR HEAD FOR MOWING MACHINES.
APPLICATION FILED JAN. 27, 1920.
1,341,212.
Patented May 25, 1920.
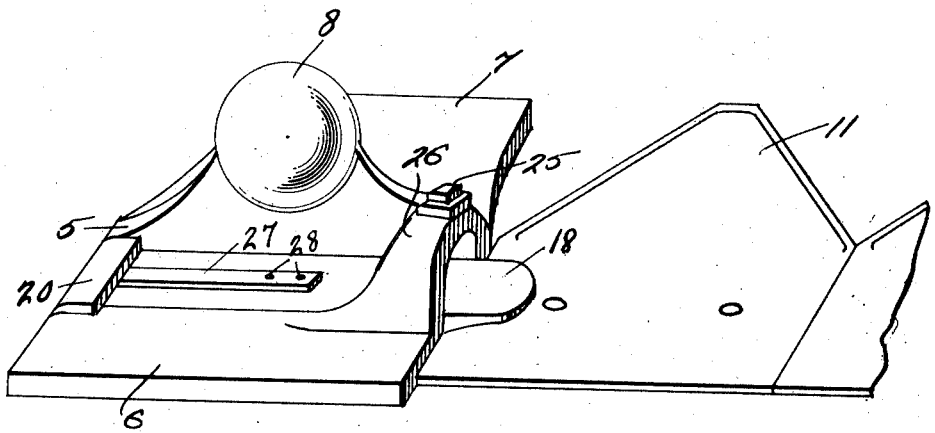
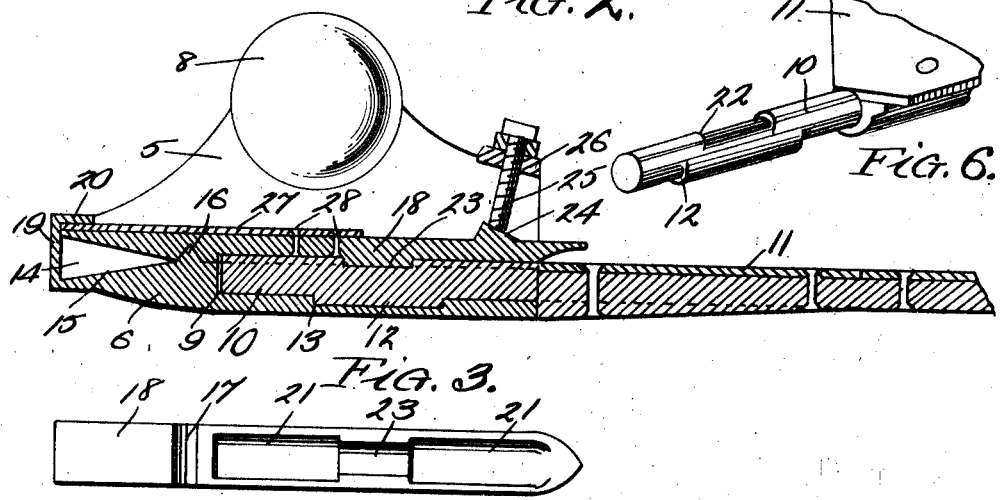
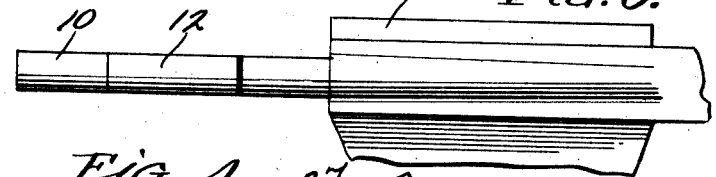
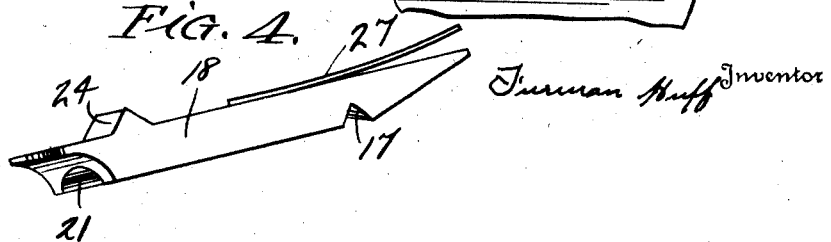

UNITED STATES PATENT OFFICE.

FURMAN HUFF, OF MARYSVILLE, CALIFORNIA.

SICKLE-BAR HEAD FOR MOWING-MACHINES.

1,341,212.  Specification of Letters Patent.  Patented May 25, 1920.

Application filed January 27, 1920. Serial No. 354,464.

*To all whom it may concern:*

Be it known that I, FURMAN HUFF, a citizen of the United States, residing at Marysville, in the county of Yuba and State of California, have invented certain new and useful Improvements in Sickle-Bar Heads for Mowing-Machines, of which the following is a specification.

My invention relates to improvements in sickle bar heads for mowing machines and has for its primary object to provide a device of this character whereby the sickle bar may be quickly and easily detached from the head for the purpose of grinding the knives or if necessary to substitute a new bar of similar design.

A further object of the invention lies in the provision of a head having a groove to receive the projecting shank of the sickle bar, a clamping plate fulcrumed over the shank, a set screw for securing the plate in locked position, and means for automatically raising the plate when the screw is released, to permit the withdrawal of the sickle bar.

A further object of the invention lies in the general arrangement of parts which facilitate in producing a sickle bar head of a highly efficient and reliable character which may be manufactured at a minimum cost.

Other objects and advantages of the invention will be apparent during the course of the following description.

In the accompanying drawings forming a part of this specification and in which like numerals are employed to designate like parts throughout the same, Figure 1 is a perspective view of my improved sickle bar head in operative position;

Fig. 2 is a longitudinal sectional view thereof;

Fig. 3 is a bottom detail view of the clamping plate;

Fig. 4 is a perspective view of the clamping plate;

Fig. 5 is a fragmentary view of one end of the sickle bar; and

Fig. 6 is a fragmentary perspective view of the end of the sickle bar.

In the drawings, wherein for the purpose of illustration, I have shown a preferred embodiment of my invention, the numeral 5 indicates the improved head in general having oppositely projecting webs or plates 6 and 7, and a pitman connection 8 projecting upwardly from the center thereof. Extending longitudinally through the web 6 adjacent the pitman connection 8 is a groove 9 of irregular depth. This groove is adapted to receive the projecting shank 10 of the sickle bar 11 which is of approximately the same length as the groove. The central portion of the shank 10 is provided with a depending rib 12 on its under side which snugly fits the correspondingly shaped recess 13 formed intermediate the length of the groove 9. Directly in rear of the groove 9 a recess 14 is cut having an inclined bottom 15, the purpose of which will be hereinafter set forth. At the jointure of the bottom 15 with the groove 9 is formed a triangular shaped rib 16 which fits the correspondingly shaped recess 17 cut transversely adjacent one end of the clamping plate 18. The plate 18 is of a substantially rectangular shape, having its rear end tapering slightly from its pivotal point of connection with the fulcrum 16 so that when tilted upwardly the end will snugly fit within the recess 14. The back of the recess 14 is provided with a vertically extending wall 19 which is bent at right angles to provide the overlapping edge 20 which acts as an abutment for the end of the clamping plate 18.

The forward portion of the plate 18 is provided with spaced recesses 21 which are curved transversely to conform to the shape of the shank 10 with which they coöperate. The shank 10 is provided with the cut-out portion 22 intermediate its length which receives the partition 23 between the recesses 21 of the plate 18. The upper surface of the forward end of the plate 18 is provided with an inclined boss 24 which acts as a seat for the set screw 25 that passes through the arch 26 extending over the forward end of the groove 9. Extending longitudinally of the rear end of the plate 18 is a leaf spring 27 having one end securely fastened to the base of the plate through the medium of rivets 28. The opposite end of the spring passes beneath the abutment 20 and when the set screw 25 is released from engagement with the boss 24 the spring will automatically tilt the plate upwardly so as to permit the removal of the sickle bar.

In operation, the sickle bar 11 is reciprocated in the usual manner but should it be desired to sharpen the blades or substitute a new bar, the bar may be readily removed from the head which will permit this work to be accomplished more satisfactorily and efficiently. To release the bar, the set screw 25 is loosened, whereupon the leaf spring 27 will automatically tilt the plate 18 and by slightly lifting the bar 11 so as to disengage the depending rib 12 of the shank 10 from the recess 13, the bar may be easily withdrawn from the head. Upon replacing the bar the shank is inserted in the groove until the rib engages the recess and then by tightening the set screw 25 the clamping plate 18 will be forced downwardly so that the partition 23 will engage the cut-out portion 22 of the shank 10, thus firmly holding and guiding the sickle bar when reciprocated. It is obvious from the foregoing that the arrangement of parts is very simple which will permit the device to be manufactured at a minimum cost.

It is to be understood that the form of my invention herewith shown and described, is to be taken as a preferred example of the same, and that certain changes in the shape, size, and arrangement of parts may be resorted to without departing from the spirit of the invention or the scope of the subjoined claims.

Having thus fully described my invention, I claim:—

1. A sickle bar head of the class described including a groove of irregular depth, a sickle bar having a shank projecting therefrom of such a shape as to fit said groove, a clamping plate fulcrumed at one end of the groove, and means for securing said plate in its relative position.

2. A sickle bar head of the class described including a longitudinal groove, a recess in said groove, a sickle bar having a projecting shank of such shape as to fit the said groove, and a clamping plate covering said shank.

3. A sickle bar head of the class described including a longitudinal groove, a recess midway its length, a sickle bar having a shank projecting therefrom, a depending rib on said shank for fitting said recess, a clamping plate covering the shank, and means for holding said plate tightly against the shank.

4. A sickle bar head of the class described including a longitudinal groove, a recess midway its length, a sickle bar having a shank projecting therefrom, a rib and recess on alternate sides of said shank, said rib fitting said recess of the groove, a clamping plate having spaced recesses, the partition between said recesses fitting the said recess in the shank, and means for securely holding the plate in its relative position.

5. A sickle bar head of the class described including a longitudinal groove, a recess midway its length, a clamping plate covering said groove, a sickle bar with a projecting shank for insertion in said groove, means for securely holding the shank within the groove, and a spring for tilting said plate when released.

6. A sickle bar head of the class described including a longitudinal groove, a recess midway its length, a sickle bar having a projecting shank for insertion in said groove, a rib and recess on alternate sides of said shank, said rib adapted to fit the recess of the groove, a clamping plate fulcrumed at one end of the groove, spaced recesses formed on the underside of said plate, the partition between said recesses fitting the recess in the shank, means for normally holding the plate in locked position, and spring means for tilting the plate when the locking means is released.

In testimony whereof I have affixed my signature in the presence of two witnesses.

FURMAN HUFF.

Witnesses:
T. P. COATS, Jr.,
C. B. HILL.